Dec. 31, 1963   H. A. ROBINSON   3,115,741
WEED CUTTER AND CHOPPER ATTACHMENT
Filed Feb. 14, 1961   3 Sheets-Sheet 1
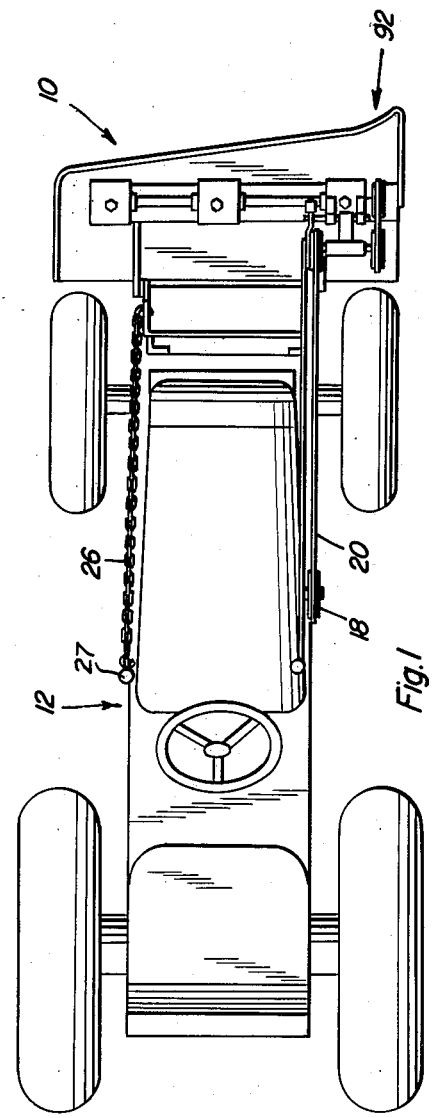
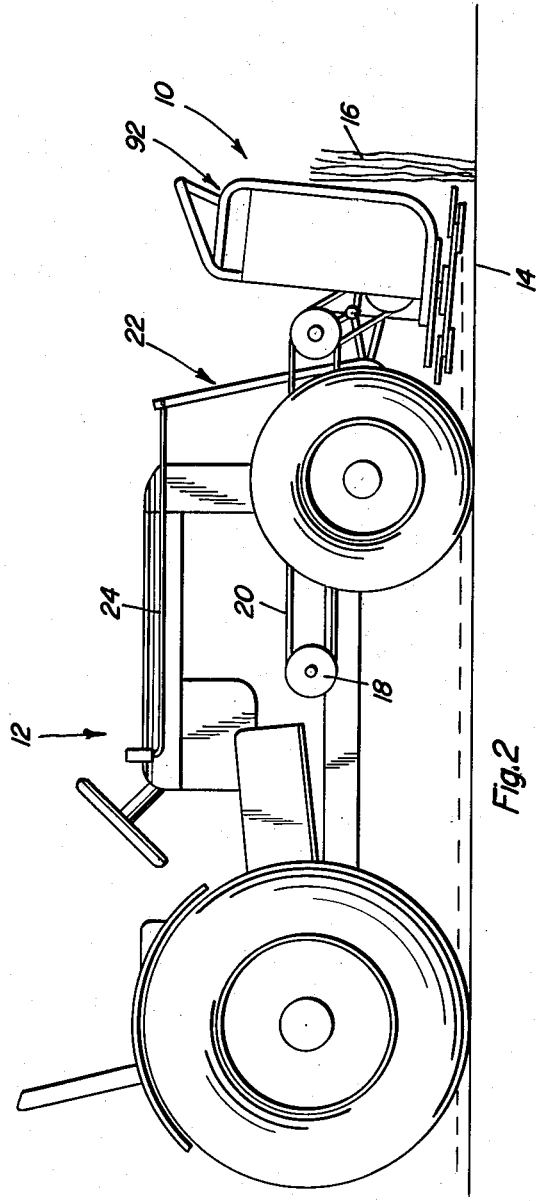
Harry A. Robinson
INVENTOR.

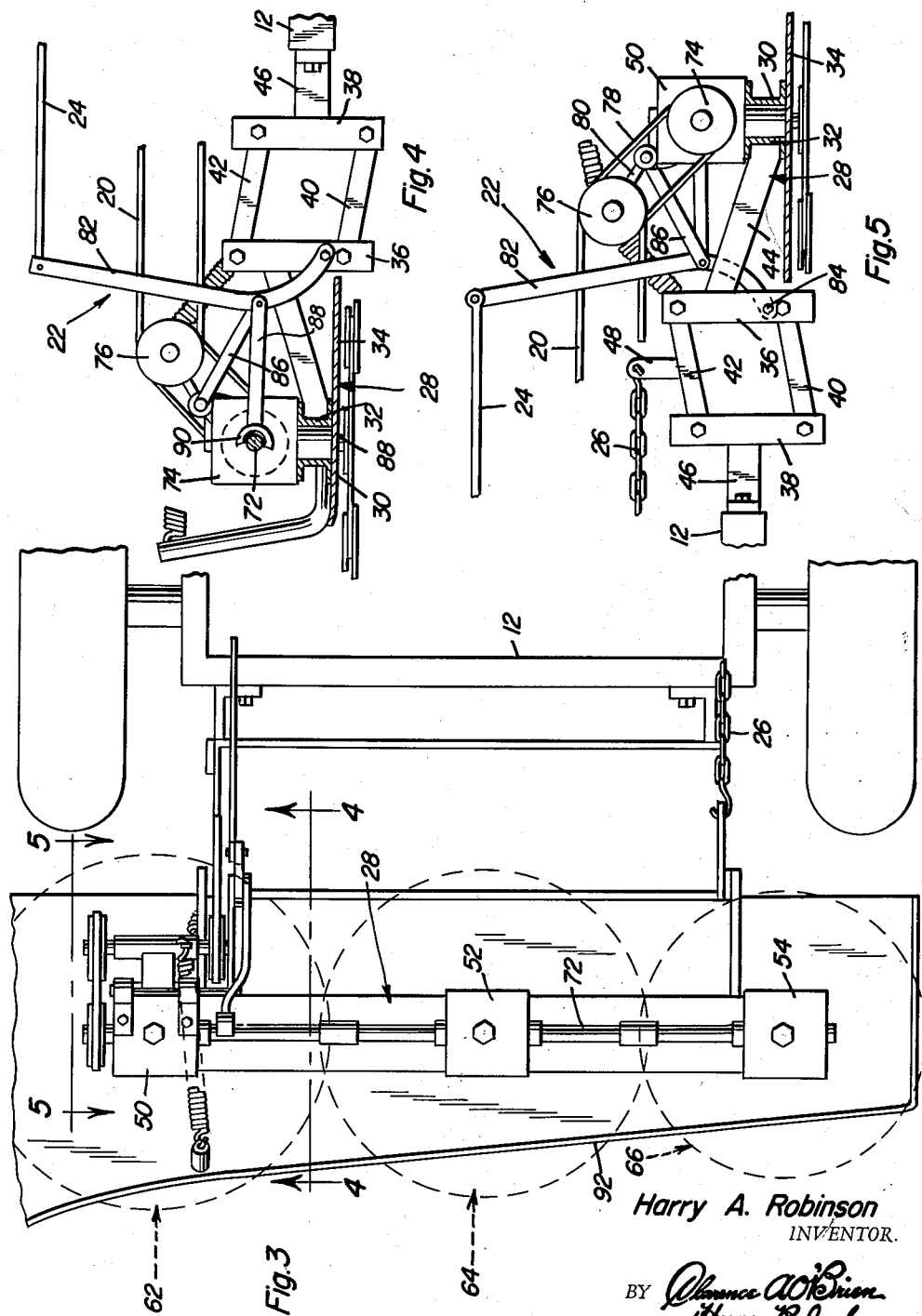

Dec. 31, 1963  H. A. ROBINSON  3,115,741
WEED CUTTER AND CHOPPER ATTACHMENT
Filed Feb. 14, 1961  3 Sheets-Sheet 3
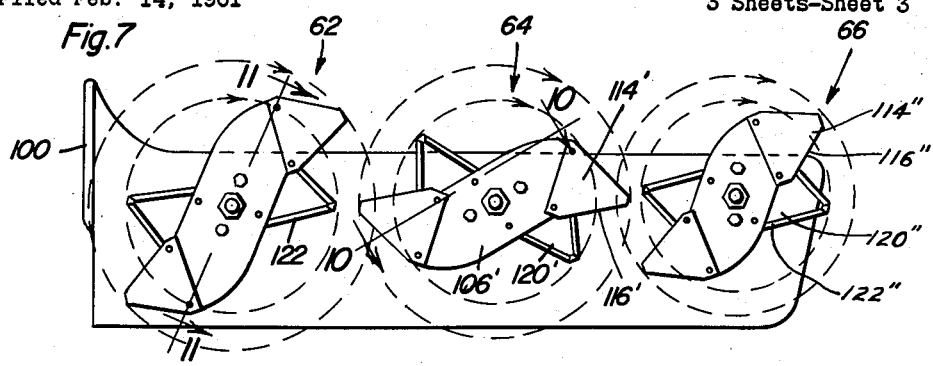
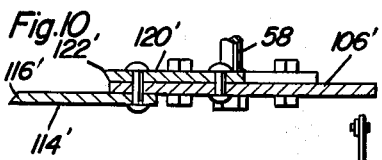
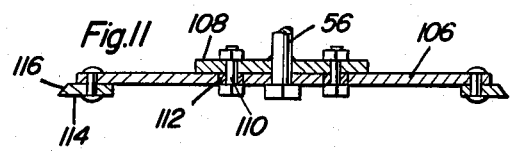
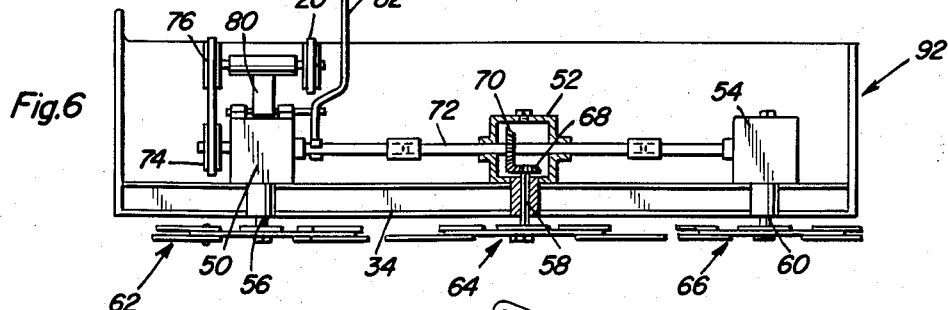
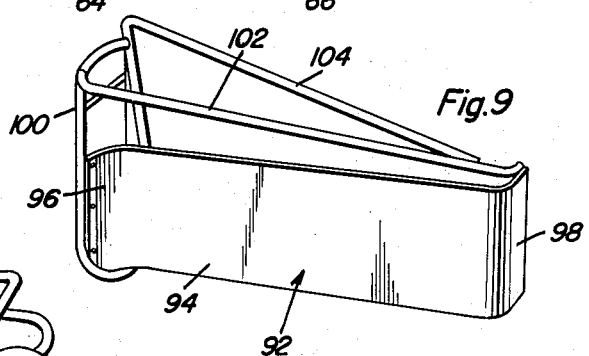
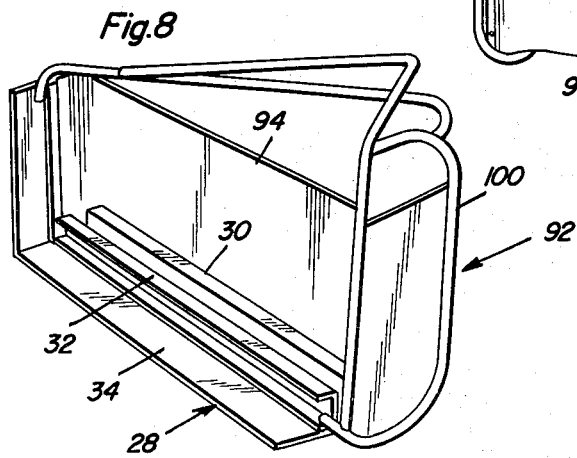
Harry A. Robinson
INVENTOR.
BY

United States Patent Office 3,115,741
Patented Dec. 31, 1963

3,115,741
WEED CUTTER AND CHOPPER ATTACHMENT
Harry A. Robinson, 2625 Johnson, Elkhart, Ind.
Filed Feb. 14, 1961, Ser. No. 89,282
18 Claims. (Cl. 56—503)

This invention relates to a weed cutter or mowing attachment especially adapted for mounting on a garden tractor.

A primary object of this invention is to provide a more efficient weed or brush cutter and chopper machine adapted to be mounted forwardly of a garden tractor for operation thereof which machine is especially useful for mowing close to wire fences or other similar obstructions which render close mowing difficult without damage to the machine or to the fence.

Another object of this invention is to provide a weed cutting machine which the operator is better able to supervise in the cutting operation and which machine is adjustable and safer than comparable mowing machines heretofore used.

A further object of this invention is to provide a weed mowing machine having multi-bladed cutting rotors which are arranged to more effectively cut and mow weeds by virtue of the blade arrangement on each of the cutting rotors and the locational relationships between the adjacent cutter rotor assemblies.

An additional object of this invention is to provide a weed mowing machine which features a novel shield construction mounted forwardly of the cutter rotor assemblies and locationally related thereto so as to discharge cut and mulched weeds to one lateral side of the mowing machine for more effective weed cutting purposes and to prevent clogging of the machine to render it more effective for mowing tall and stubborn weeds and hence better able to cope with overgrown areas than would be expected of machines of comparable size and power. The shield construction also features a fence guard on one side thereof by means of which the mowing machine may be brought close up against a fence for cutting of weeds and yet protect the machine and fence from each other.

The weed mowing machine of the present invention includes a frame which is mounted forwardly of a garden type tractor in an adjustable manner. The frame is accordingly spaced above the ground at a fixed optimum forward inclined angle thereto so as to rotatably mount a plurality of cutter assemblies in laterally spaced relation to each other with the blades of said assemblies being disposed at said inclined angle with the rear portion of the blades being elevated above the forward portion thereof to thereby prevent rear drag on the blades by the weed stubble. The rotating forward portion of the blade projects forwardly from and below a shield assembly which is mounted on the frame. The shield assembly is not only provided for the purpose of protecting the cutter assembly drive mechanism disposed therebehind but also is arranged to laterally deflect the weeds toward one side so as to prevent clogging of the machine by the cut and mulched weeds. Also connected to one side of the frame and shield assembly is a fence guard by means of which the mowing machine may be brought close up against the fence and protected therefrom. The drive for the cutter assemblies is provided by a power take-off from the tractor involving a belt drive which is rendered effective by a belt tightener by operation of a control mechanism within easy reach of the operator on the garden tractor. The cutter assemblies includes blade rotors having overlapping outer diameter portions of progressively decreasing dimension in a direction toward the discharge side of the attachment frame. Accordingly, the weeds cut by the blades are conveyed thereby for discharge at the discharge side of the attachment in conjunction with the guiding influence of the shield construction. Each of the cutter assembly blades includes radially outer blade portions which are disposed non-radially so as to provide a threshing action and are mounted below radially inner blade portions with bevel cutting edges facing upwardly so as to propel the cut weeds upwardly into the cutting zone of the radially inner blade portions for chopping and mulching of the weeds. While the radially outer blade portions of each of the cutter assemblies dimensionally overlap, the cutter assemblies are driven in the same direction and at the same speed but are angularly out of alignment so as to avoid any contact between the outer blade portions. However, the outer blade portions and inner blade portions of adjacent cutter assemblies will periodically become radially aligned with each other so as to provide additional cutting and eliminate weed winding about the cutter assembly spindles. In view of the foregoing, a considerably improved weed mowing machine is provided.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a mowing attachment made in accordance with this invention and mounted on a garden type tractor.

FIGURE 2 is a side elevational view of the mowing attachment and tractor mount as illustrated in FIGURE 1.

FIGURE 3 is an enlarged partial top plan view of the mowing attachment.

FIGURE 4 is a sectional view taken substantially along a plane indicated by section line 4—4 of FIGURE 3.

FIGURE 5 is a sectional view taken substantially along the plane indicated by section line 5—5 of FIGURE 3.

FIGURE 6 is a rear view of the mowing attachment with parts shown in section.

FIGURE 7 is a sectional view taken substantially through a plane indicated by section line 7—7 of FIGURE 6.

FIGURE 8 is a perspective view of the shield construction for the mower attachment illustrating the rear portion thereof.

FIGURE 9 is a perspective view of the shield construction illustrating the forward portion thereof.

FIGURE 10 is a sectional view taken substantially through a plane indicated by section line 10—10 in FIGURE 7.

FIGURE 11 is a sectional view taken substantially through a plane indicated by section line 11—11 in FIGURE 7.

Referring now to the drawings in detail, it will be observed from FIGURES 1 and 2 that the mowing attachment of the present invention which is generally indicated by reference numeral 10 is mounted forwardly of a garden type tractor 12. It will be observed from FIGURE 2, that the attachment 10 is mounted in spaced relation above the ground 14 at a forward inclined angle thereto so as to prevent drag on the cutter assembly blades by the stubble of the weeds 16 being cut. In order to power the mowing machine 10, the tractor power take-off pulley 18 is drivingly connected to the mowing machine attachment by means of the endless drive belt 20 disposed on one lateral side of the tractor 12. Also mounted on the same lateral side of the tractor is the drive control mechanism generally referred to by reference numeral 22 for the mowing machine 10 which includes a rearwardly extending control rod 24 placing the control mechanism 22 within easy grasp of the operator of the tractor 12. Mounted on the other side of the tractor vehicle 12 as most clearly seen from FIGURE 1, is a chain 26 by means of which the mowing machine 10 may be adjustably positioned in spaced relation above the ground at the same forwardly inclined angle as indicated in FIGURE 2, as will be hereafter explained. The chain 26 is accordingly anchored at opposite ends thereof to the chassis of the tractor 12 and to the frame of the mowing machine 10.

Referring now to FIGURES 3, 4 and 5, it will be observed that the attachment frame means on structure for the machine 10 generally referred to by reference numeral 28 includes a pair of angle members 30 and 32 interconnected by a bottom plate member 34. A parallelogram connecting mechanism is provided including a pair of parallel substantially vertical members 36 and 38 interconnected by a lower link member 40 and an upper link member 42, with the member 36 being connected to the channel member 32 by the connecting member 44. The other member 38 of the parallelogram connecting mechanism is connected by member 46 to the chassis frame of the vehicle 12. It will be understood that such parallelogram connections are provided at both lateral sides of the vehicle and mowing machine frame. The chain 26 is accordingly connected by the upwardly projecting ear 48 on the link member 42 to the chassis frame by a control lever 27 thereby holding the parallelogram connecting mechanism in one particular position so as to hold the mowing frame in adjustably spaced relation above the ground. By positioning the control lever, the frame 28 of the mowing machine may be quickly raised and lowered to avoid stumps, stones and other debris without stopping the machine, with the frame being maintained parallel to the fixed forward inclination for all positions thereof by virtue of the parallelogram linkage.

Referring now to FIGURE 6 as well as to FIGURES 3, 4 and 5, it will be observed that a plurality of gear boxes 50, 52 and 54 are mounted above the plate member 34 of the machine frame 28 in laterally spaced relation to each other. Extending downwardly from the gear boxes through the frame assembly 28, are a plurality of rotor shafts or spindles 56, 58 and 60 for respectively mounting therebelow cutter assemblies 62, 64 and 66 establishing a common cutting plane as more clearly seen in FIGURE 6. The rotor shafts accordingly have connected thereto within the gear boxes a drive gear such as bevel gear 68 which meshes with a gear 70 connected in common to a drive shaft 72. As illustrated in FIGURE 6, the drive shaft 72 may be composed of coupled sections and will be effective to drive all of the cutter assemblies in the same direction and at the same speed. The drive for the gear boxes is accordingly derived from the power take-off pulley 18 on the tractor vehicle 12 with which the mowing machine is associated as was hereinbefore mentioned.

It will be observed therefore that the drive shaft 72 extends laterally out of the gear box 50 and has connected thereto an input pulley wheel 74. The input pulley 74 is accordingly drivingly connected to a belt tensioning pulley wheel 76 by means of a short drive belt 78. The belt tensioning pulley wheel 76 is also drivingly connected to the power take-off pulley 18 by the drive belt 20. The belt tensioning pulley wheel 76 is therefore rotatably mounted on a pivot arm 80 which arm is pivotally mounted from a rear upper side of the gear box 50. The pivotal mounting of the pivot arm 80 is so arranged with respect to the drive axis of the drive pulley 74 that upward movement thereof will cause the drive belt 78 to be tensioned for rendering the drive effective. Conversely, downward movement of the pivot arm 80 with the belt tensioning pulley 76 will cause loosening of the drive belt 78 to render the drive to the input pulley wheel 74 ineffective. The control mechanism 22 is accordingly provided for such purpose and includes a control lever 82 to which the control rod 24 is connected for operator manipulation. The control lever 82 is pivotally mounted on the member 36 by a pivot bolt 84 and is pivotally connected to the pivot arm 80 by means of an extension 86 thereof projecting rearwardly for pivotal connection to the control lever 82. It will therefore be apparent, that pivotal movement of the control lever 82 in one direction will cause upward pivoting of the pivot arm 80 to tension the drive belt 78 while pivotal movement of the control lever 82 in the other direction will cause slackening of the drive belt 78 to render the drive ineffective. When the control lever 82 is pivotally moved in a direction to slacken the drive belt 78, it also causes forward movement of a brake link 88 pivotally connected thereto for engaging the brake element 90 with the drive shaft 72 in order to retard and stop movement of the drive mechanism for the cutter assemblies when the power is disconnected therefrom by slackening of the drive belt 78. Accordingly, the operator has effective and yet simple mechanism for controlling the drive of the cutter assemblies.

It will be observed that the frame 28 of the mowing machine 10 mounts thereon shield means which is generally referred to by reference numeral 92. The shield assembly 92 as seen in FIGURE 2 is disposed above the cutter assemblies with the cutter assemblies projecting forwardly therefrom for purposes of cutting the weeds 16. It will also be seen from FIGURE 3, that the shield assembly 92 is disposed at an angle extending rearwardly from one lateral side of the machine to the other. Referring therefore to FIGURES 8 and 9 in particular, it will be observed that the shield assembly 92 is mounted on the plate member 34 of the machine frame assembly 28 and generally forwardly of the channel members 30 and 32 through which the gear box drive mechanism for the cutter assemblies are mounted. The shield assembly includes a front shield member 94 which has a forwardly projecting portion 96 at one lateral side thereof with the opposite discharge side having a rearwardly curved portion 98. It will be appreciated therefore, that the weeds cut by the cutter assemblies below the front shield member 94 will be deflected from one side portion 96 of the front shield to the other or discharge side in response to forward movement of the mowing machine with the shield. Also connected to the forward projecting side of the shield assembly 92 and to the frame 28 is protective fence guard means 100 of tubular construction which also projects upwardly above the front shield member 94. The fence guard 100 is thereby effective to maintain the mowing machine and the rotating blade assemblies thereof closely spaced relative to a fence against which the mowing machine may be moved for close mowing purposes. The shield assembly 92 is also provided with guide means including a pair of top guide rail members 102 and 104 which are interconnected between the upper ends of the fence guard 100 and the discharge end portion of the front shield member 94. The rail guide 102 also projects forwardly of the front shield member 94 and is disposed thereabove so as to encourage side slippage of the weeds and brush as the mowing machine moves therethrough. Operation of the mowing machine is thereby facilitated and clogging thereof prevented.

Referring now to FIGURES 7, 10 and 11 in particular it will be observed that each of the cutter assemblies 62, 64 and 66 are of similar construction but dimensionally differ from each other insofar as the diametral dimensions thereof are concerned. Accordingly the largest cutter assembly 62 is disposed at one end of the machine with the cutter assemblies progressively decreasing in diameter toward the discharge end of the mowing machine. Also, it will be observed that the outer diameters of the cutter assemblies overlap each other by a certain amount for purposes as will be hereafter explained. Each of the cutter assemblies includes therefore a blade carrier member 106, 106′ or 106″ which is connected to its rotor shaft 56, 58 or 60 in a resilient manner for shock absorption purposes. For example, as shown in FIGURE 11, the rotor shaft 56 is welded to a plate member 108 which in turn is connected to the blade carrier member 106 by a pair of bolt members 110 which extend through rubber cushion members 112 disposed within the blade carrier member. The blade carrier members of each of the blade assemblies include a pair of radially outer replaceable blades 114, 114' or 114" which includes cutting edges 116, 116' or 116" defined by upwardly facing beveled surfaces. The radially outer blades 114 are mounted on the underside of the blade carriers and are also disposed at an angle to a radial line in the direction of rotation of the cutter assembly. As a result thereof, a threshing action is developed by the cutter assemblies. Furthermore, the upwardly facing beveled surface of the cutting edges will cause the cut weeds to move upwardly after leaving the cutting zone defined by the rotating cutter edges on the outer blades. The cut weeds then move into a radially inner cutting zone in which they are chopped and mulched by pairs of radially inner blades 120, 120' or 120" provided on each of the cutter assemblies.

The inner blades are mounted on top of the blade carriers and present cutting edges 122, 122' and 122" defined by bevel surfaces facing downwardly. The cut weeds are accordingly effectively chopped by the chopping blades 120 when they enter the radially inner cutting zone thereof. It will be observed, from FIGURES 7, 10 and 11, that the radially overlapping outer blades form a continuous cutting zone within a common cutting plane, while the inner blades form spaced chopping zones within a plane spaced in parallel relation above the cutting plane.

It will also be observed from FIGURE 7 in particular, that the cutter assemblies while driven in the same direction and at the same speed are angularly orientated with respect to each other so that the radially outer cutting blades 114 of adjacent cutter assemblies will never become radially aligned. Interfering contact between the cutter assemblies is thereby avoided. However, periodically radial alignment occurs between the radially outer cutter blades and the radially inner chopper blades on adjacent cutter assemblies which thereby provide additional cutting action and which also prevent weeds winding about the rotor shaft of the cutter assembly. It will also be appreciated that by virtue of the overlapping relationship of the cutter assemblies, the weeds will be conveyed by the forwardly projecting portions of the rotating blades which project forwardly of the front edge of the front shield member 94 so as to positively discharge the weed cuttings in cooperating with the guiding and deflecting action of the front shield member to the discharge side of the mowing machine.

From the foregoing description, operation and utility of the present invention will be apparent. It will therefore be appreciated that the novel arrangement of the cutter assemblies with respect to each other and with respect to the novel shield assembly together with the novel construction of each cutter assembly itself, the mowing machine of the present invention may be operated at lower and safer speeds and is less likely to become clogged by any thick weed or brush growth. The mowing machine of the present invention is further endowed with the advantages of being able to mow close up to fences or other such obstructions and provides easy control and guiding facilities for the machine operator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A weed cutting and mulching attachment for a garden tractor movable in a forward direction comprising, frame means mounted forwardly of the tractor and at a forward inclination in spaced relation above the ground having two lateral sides, shield means mounted on said frame means forwardly thereof in said forward direction for deflecting cut weeds toward one of said lateral sides of the frame means, cutter means constituting a discharge side rotatably mounted by the frame means and projecting forwardly in a common cutting plane disposed at said forward inclination below the shield means for cutting, mulching and discharging weeds in one lateral direction toward said discharge side of the frame means.

2. The combination of claim 1, including protective guard means connected to the shield means and the frame means on the other of said two lateral sides thereof and projecting upwardly thereabove and guide means connected to the guard means and the shield means and extending forwardly in said forward direction between the guard means and said discharge side of the frame means above the shield means for inducing lateral slippage of weeds in response to forward movement of the frame means in said forward direction.

3. The combination of claim 1, including means for vertically positioning the frame means above the ground at the same forward inclination thereto.

4. The combination of claim 3 including cutter drive means operatively connected to the cutter means and mounted on the frame means rearwardly of the shield means.

5. The combination of claim 4, including power take-off drive means mounted on the frame means at the other lateral side thereof and drivingly connected to the cutter drive means and control means movably mounted by the frame and operatively connected to the power take-off drive means to render it effective in one position and brake the cutter drive means in another position thereof.

6. The combination of claim 5, wherein said cutter means comprises a plurality of rotor blade means mounted in spaced relation to each other laterally with respect to the frame means, said rotor blade means including radially overlapping portions progressively decreasing in diameter in a direction toward said discharge side of the frame means.

7. The combination of claim 6, wherein each rotor blade means comprise a rotor shaft, a blade carrier resiliently mounted at a lower end of the rotor shaft, radially outer cutting blades forming said radially overlapping portions fixedly mounted below the blade carrier and having upwardly facing beveled cutting edges defining one of a plurality of radially overlapping weed cutting zones, in said cutting plane, and radially inner chopping blades fixedly mounted above the blade carrier and having downwardly facing beveled cutting edges defining one of a plurality of spaced weed chopping zones in parallel spaced relation above said cutting plane.

8. The combination of claim 7, wherein said cutting blades are non-radially mounted on the blade carrier in the direction of rotation for providing a threshing action.

9. The combination of claim 8, wherein said rotor blade means are driven at the same speed and in the same direction in angularly spaced relation to each other avoiding radial alignment and contact between said radially overlapping portions of said outer cutting blades of adjacent rotor blade means but periodically providing radial alignment between radially outer cutting blades and radially inner chopping blades for additional and more effective cutting action.

10. In a weed cutting and mulching attachment, the combination of frame means having a lateral discharge side and cutter means comprising, a plurality of rotor blade means mounted in spaced relation to each other laterally with respect to the frame means, said rotor blade means having radially overlapping portions progressively decreasing in diameter in a direction toward said lateral discharge side of the frame means.

11. The combination of claim 10, wherein each rotor blade means comprises a rotor shaft, a blade carrier resiliently mounted at a lower end of the rotor shaft, radially outer cutting blades fixedly mounted below the blade carrier and having upwardly facing beveled cutting edges defining one of a plurality of radially overlapping weed cutting zones, in said cutting plane, and radially inner chopping blades fixedly mounted above the blade carrier and having downwardly facing beveled cutting edges defining one of a plurality of spaced weed chopping zones in parallel spaced relation above said cutting plane.

12. The combination of claim 11, wherein said cutting blades are non-radially mounted on the blade carrier in the direction of rotation for providing a threshing action.

13. The combination of claim 12, wherein said rotor blade means are driven at the same speed and in the same direction in angularly spaced relation to each other avoiding radial alignment and contact between said radially overlapping portions of said outer cutting blades of adjacent rotor blade means but periodically providing radial alignment between radially outer cutting blades and radially inner chopping blades for additional and more effective cutting action.

14. A shield construction for a weed cutting and mulching attachment including a frame having a lateral discharge side comprising, a deflecting shield assembly mounted forwardly on the frame for deflecting cut weeds toward said lateral discharge side, a laterally protective guard connected to the shield means and the frame on a side thereof opposite said discharge side and projecting upwardly thereabove and guide means connected to the guard and frame and extending forwardly between the guard and said one lateral discharge side of the frame above the shield assembly for inducing lateral slippage of weeds in response to forward movement of the frame.

15. A weed cutting and mulching attachment for a garden tractor or the like comprising, frame means mounted forwardly of the tractor and at a forward inclination in spaced relation above the ground, shield means mounted forwardly on said frame means for deflecting cut weeds toward one lateral discharge side of the frame means, cutter means rotatably mounted by the frame means and projecting forwardly of and below the shield means for cutting, mulching and discharging weeds at said one lateral discharge side, means for adjustably positioning the frame means above the ground at the same forward inclination thereto, cutter drive means operatively connected to the cutter means and mounted on the frame means rearwardly of the shield means, power take-off drive means mounted on the frame means at a lateral side thereof opposite said discharge side and drivingly connected to the cutter drive means and control means movably mounted by the frame means and operatively connected to the power take-off drive means to render it effective in one position and brake the cutter drive means in another position thereof.

16. The combination of claim 15 wherein said cutter means comprises a plurality of rotor blades mounted in spaced relation to each other laterally with respect to the frame means, said rotor blades having radially overlapping portions of progressively decreasing diameters in a direction toward said discharge side of the frame means.

17. A brush cutting device comprising an attachment frame structure; means for pivotally mounting the attachment structure on a power vehicle; a plurality of shafts carried by the attachment structure spaced from one edge thereof remote from the pivotal mounting thereof, said shafts having a plurality of radially overlapping rotary cutters forming a continuous elongate cutting zone within a common cutting plane closely spaced in adjusted position above the ground; a drive shaft mounted parallel to the pivot for the attachment structure adapted to receive power from the vehicle; and drive means interconnecting said shafts for simultaneous rotation in the same directional sense, said drive means permitting the attachment structure to be swung about its pivot without interference.

18. A mowing attachment for a powered vehicle comprising, attachment frame means, cutter means rotatably mounted by the frame means for establishing overlapping cutting zones in a common cutting plane spaced above the ground at an acute angle thereto, chopping blade means mounted on the cutter means for movement therewith to establish spaced chopping zones in parallel spaced relation above the common cutting plane, and drive means operatively connected to said cutter means for imparting movement thereto in one directional sense to cut, chop and convey cuttings in one lateral direction with respect to the powered vehicle.

References Cited in the file of this patent

UNITED STATES PATENTS

| | | |
|---|---|---|
| 2,576,886 | McCoy | Nov. 27, 1951 |
| 2,642,711 | Smith et al. | June 23, 1953 |
| 2,828,599 | Haynes | Apr. 1, 1958 |
| 2,835,094 | Black | May 20, 1958 |
| 2,849,851 | Hayter | Sept. 2, 1958 |
| 2,991,612 | Holmes | July 11, 1961 |